Figure 1:
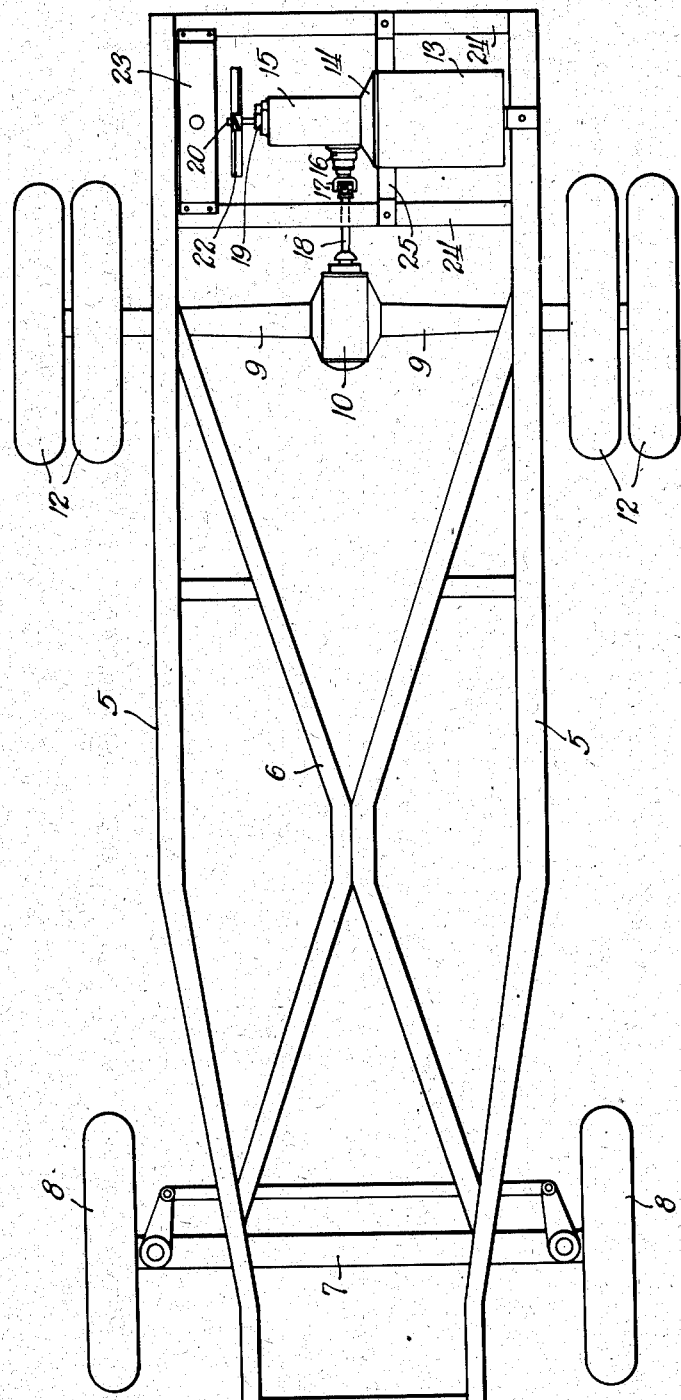

Nov. 11, 1941.  A. E. GRATER  2,262,456
MOTOR VEHICLE
Filed Aug. 23, 1940  2 Sheets-Sheet 1

INVENTOR.
Alfred E. Grater.
BY Walter E. Schirmer
ATTORNEY.

Nov. 11, 1941.  A. E. GRATER  2,262,456
MOTOR VEHICLE
Filed Aug. 23, 1940  2 Sheets-Sheet 2
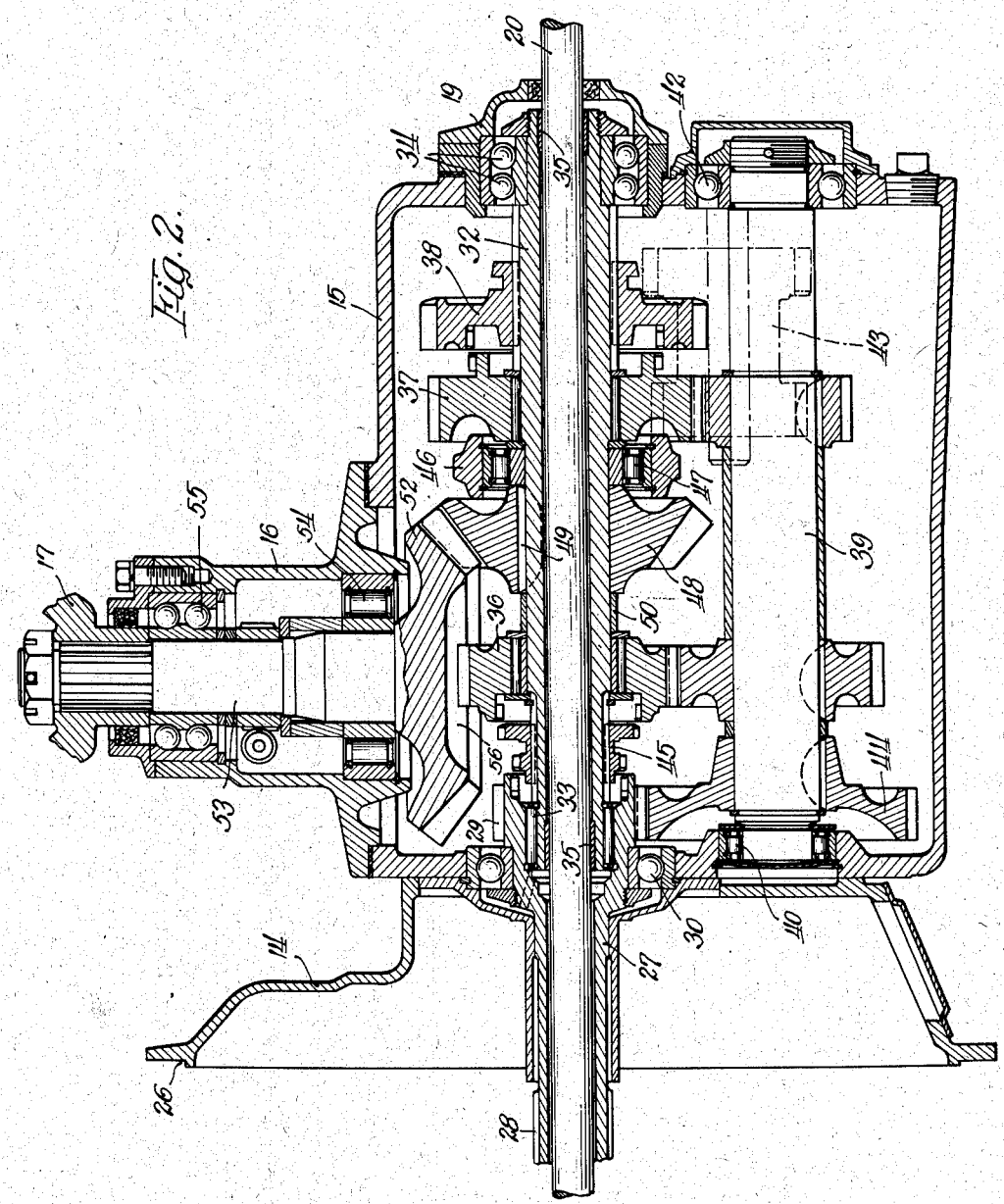
INVENTOR.
Alfred E. Grater.
BY Walter E. Schirmer
ATTORNEY.

Patented Nov. 11, 1941

2,262,456

UNITED STATES PATENT OFFICE 2,262,456

MOTOR VEHICLE

Alfred E. Grater, Niles, Mich., assignor to Clark Equipment Company, Buchanan, Mich., a corporation of Michigan Application August 23, 1940, Serial No. 353,815

13 Claims. (Cl. 180—54)

This invention relates to motor vehicles of the type employing a rear engine drive in which the rear engine is mounted transversely of the vehicle rearwardly of the rear axle. It has particular application to busses and commercial vehicles where it is desirable to mount the engine at the rear in order to obtain more passenger space and provide a more balanced structure.

One of the primary objects of the present invention is to provide a transmission structure in connection with a rear engine mounting which will allow the propeller shaft leading from the transmission to the rear axle to be mounted as close to center as possible in order to eliminate as much as possible offsetting of the differential frame in the rear axle housing.

In some rear engine drives with which I am familiar, the drive is taken from angle gearing at the extreme end of the transmission and extends from a diagonally extending propeller shaft to a centrally located differential housing of the rear axle. Another arrangement for certain applications is shown in the copending application of myself and Walter E. Schirmer, Serial No. 342,462, filed June 26, 1940.

The present construction concerns itself mainly with the provision with a straight through shaft from the engine crank shaft which extends entirely through the transmission and at its free end is arranged to drive a fan or the like for the cooling system of the engine. Within the transmission there is mounted a quill shaft which is rotatably supported on the main shaft, and which carries the regular transmission gearing. A clutch shaft is arranged to be mounted about the engine end of the through shaft, and has a main driving gear within the transmission which drives the countershaft of the transmission in the usual manner. Mounted upon the transmission intermediate the various sets of change speed gearing is a beveled gear keyed to the quill shaft and adapted to drive a second beveled gear extending normally out of the transmission toward the differential housing of the rear axle. The output gear is so arranged that its diameter is greater than the amount of space required for the clutch shaft, drive gear, the third speed gear of the transmission and the shifter clutch therebetween, whereby all of these parts can be disposed within this longitudinal extent of the output gear, and consequently require no extension of the transmission housing to accommodate this structure.

Various other features of the invention will be more apparent from the following detailed description, which, taken in conjunction with the accompanying drawings, will disclose to those skilled in the art, the particular operation and construction of a preferred form of the present invention.

In the drawings:

Figure 1 is a diagrammatic plan view of a vehicle embodying the present invention; and Figure 2 is a horizontal sectional view through a transmission such as shown in Figure 1.

Referring to Figure 1, the chassis of the vehicle comprises the side rails 5 which are spaced apart by suitable cross members and reinforced by the X member 6. At the forward end of the chassis there is provided the usual transverse axle 7 carrying the dirigibly mounted steering wheels 8. Adjacent the rear end of the chassis but spaced forwardly thereof is a transverse axle housing 9 having a central differential housing portion 10, and provided at opposite ends with the dual wheels 12 which are driven from the differential within the housing 10. Mounted between the side rails 5 rearwardly of the housing 9 is a transversely extending power plant or engine 13 having secured thereto a bell housing 14 enclosing the main clutch to which is rigidly bolted the transmission housing 15. The transmission housing 15 is provided on one lateral surface thereof with a cap member 16 enclosing a suitable gearing which is connected through the universal joint 17 to a propeller shaft 18 leading to the differential in the rear axle.

The end of the transmission, remote from the engine 13, is provided with a suitable bearing cap 19 through which extends the main shaft 20 connected directly to the engine and on which is mounted a fan 22 adapted to draw air through the radiator 23. Suitable cross members 24 extend between the side rails 5 of the chassis to support the power plant in position, the engine being supported at its front end on one of the side rails 5 and adjacent its rear end on the cross bracing member 25. The radiator 23 is supported adjacent the opposite side rail 5 on the cross members 24.

Considering now in detail the transmission structure which is shown in Figure 2, the housing 15 of the transmission has its forward end portion secured to the bell housing 14 which is piloted into the flywheel housing of the engine by means of the pilot flange 26. It will be noted that the shaft 20 extends entirely through the bell housing 14 and transmission 15, and within the bell housing there is mounted about the shaft 20 the clutch shaft 27 which is splined as indicated at 28 for connection to the driven portion of the main clutch. At its opposite end the clutch shaft 27 is expanded to form the main drive gear 29, this portion of the shaft being supported by the bearings 30 in the transverse web of the forward end of the transmission.

Journalled upon the shaft 20 within the transmission housing 15 is a quill shaft 32, the forward end of this quill shaft being journalled by the roller bearings 33 within the recessed end of the main drive gear 29, and at its opposite end, being supported in the end wall of the transmission 15 by means of the double ball bearings 34. The quill shaft is rotatably mounted on the shaft 20 by means of needle bearings or bushings 35. The quill shaft 32 in its main aspects is similar to the tail shaft of a transmission, and has rotatably mounted thereon the third speed gear 36 and the second speed gear 37. Splined on the quill shaft 32 adjacent the rear end thereof is the first speed gear 38 which is adapted, in one position, to clutch the gear 37 to the quill shaft 32 and in another position to effect low speed driving engagement from the countershaft 39 to the quill shaft. The countershaft 39 is rotatably supported at its forward end in the roller bearings 40 and at its rear end in the thrust bearings 42. Suitable reverse gearing, diagrammatically indicated at 43 is provided, as in conventional transmissions.

It will be apparent that the main drive gear 29 drives the countershaft gear 44 and, through the countershaft, in turn drives any one of the gears 38, 37 or 36. A suitable sliding clutch member 45 is mounted upon the quill shaft 32 adjacent the main drive gear for selectively clutching either the main drive gear or the third speed gear 36 to the quill shaft, in the former case effecting direct drive between the clutch shaft and the quill shaft.

It will be noted that the transmission 15 is provided with an intermediate bearing support 46 in which is mounted the roller bearings 47 for rotatably supporting the quill shaft 32 between the second and third speed gears. Keyed to the quill shaft 32 adjacent the bearing 47 is a beveled gear 48 having the key 49. This gear is spaced from the third speed gear 36 by means of the spacing sleeve 50, thereby being held axially against the inner race of the bearing 47 to locate the gear 48 against axial movement. The bevel gear 48 drives an angularly disposed gear 52, which has formed therewith the drive shaft 53 suitably journalled by bearings 54 and 55 in the bearing cap 16 secured to the side wall of the transmission 15. The outer end of the shaft 53 is adapted to receive the companion flange of the universal joint 17.

It will be noted that the gear 52 is of a diameter such that it extends longitudinally within the transmission housing from a point adjacent the forward end wall of the housing to the bevel gear 48, and the space occupied by this gear longitudinally within the housing is sufficient to accommodate the drive gear 29, the third speed gear 36 and the clutch member 45 disposed therebetween. In order to allow maximum size for the third speed gear 36 and still retain the overall length of the transmission, as well as its width, within desired limits, the end face of the gear 52 is recessed as indicated at 56 to accommodate the teeth of gear 36 running within this recess during a portion of their revolution.

While I have illustrated the present invention as providing a drive to the differential on the longitudinal center line of the chassis, it is to be understood that with varying sizes of power plants and chassis sizes it may in some cases be necessary to employ an offset differential in the rear axle housing, which is still within the purview of the present invention.

It is therefore believed apparent that I have provided a novel type of transmission construction for a rear engine drive vehicle, and I do not intend to be limited to the specific details herein shown and described, except as defined by the scope and spirit of the appending claims.

I claim:

1. In a rear engine drive vehicle, a transversely disposed engine having a bell housing at one end thereof, a transmission housing secured to said bell housing, a hollow driven clutch shaft in said bell housing having a drive gear portion disposed in the forward end of said transmission housing, a hollow transmission main shaft journalled at one end in said drive gear portion and at the other end in the remote end of said transmission housing, a solid drive shaft extending longitudinally through both said hollow shafts, a countershaft in said transmission housing, a plurality of gear trains between said main shaft and said countershaft, a bevel gear keyed to said main shaft, and a normally extending output shaft projecting through the side of said transmission and driven from said bevel gear.

2. The combination of claim 1 wherein said drive shaft is journalled within opposite ends of said main shaft and projects outwardly of said remote end of said transmission housing.

3. The combination of claim 1 further characterized in the provision of a fan on said drive shaft beyond the end of said transmission housing.

4. In a rear engine drive vehicle, a rear axle having a rearwardly facing differential drive shaft, an engine disposed transversely of the vehicle rearwardly of said axle, a transmission including a tubular main shaft and a countershaft with axially spaced change speed gearing providing driving connections therebetween, a tubular clutch shaft driven from said engine and having a driving gear portion in said transmission for driving said counter-shaft, a bevel gear on said main shaft intermediate said gearing, an output shaft directed toward said differential drive shaft and having a bevel gear portion in said transmission driven from said first bevel gear, and a solid drive shaft extending from said engine through said clutch and main shafts and rotatable at engine speed independently of said gearing.

5. The construction of claim 4 further characterized in the provision of a fan on said last-named shaft externally of said transmission.

6. In a rear engine drive vehicle, a vehicle frame, a rear axle therebeneath, a power plant for said vehicle comprising a transversely arranged engine supported on one side of said frame rearwardly of said axle and extending toward the other side, a radiator in transverse alinement with said engine and supported on the other side of said frame, a transmission secured to said engine having a main shaft, a countershaft, change speed gearing therebetween, a laterally directed output shaft connected to said axle, gearing between said main shaft and said output shaft, an engine driven shaft extending from said engine through said transmission and rotatable at engine speed independently of said change speed gearing, and a fan on the remote end of said last-named shaft for drawing air through said radiator.

7. A transmission for a rear engine drive vehicle comprising a housing, a tubular clutch shaft extending into one end of said housing and having an enlarged drive gear portion, a tubular transmission main shaft journalled at one end in said drive gear portion and at the opposite end in the remote end of said transmission, a counter-shaft, axially spaced change speed gear sets between said countershaft and main shaft, a bevel gear keyed on said main shaft substantially in the longitudinal center thereof, and a second bevel gear driven thereby and of a diameter such as to overlie said drive gear portion of said clutch shaft and the main shaft gear of one of said gear sets, said second bevel gear having a laterally directed output shaft.

8. A transmission for a rear engine drive vehicle comprising a housing, a tubular clutch shaft extending into one end of said housing and having an enlarged drive gear portion, a tubular transmission main shaft journalled at one end in said drive gear portion and at the opposite end in the remote end of said transmission, a counter-shaft, axially spaced change speed gear sets between said countershaft and main shaft, a bevel gear keyed on said main shaft substantially in the longitudinal center thereof, output shaft means driven from said bevel gear, and a solid drive shaft extending axially through said clutch shaft and said main shaft and rotatable independently thereof.

9. A transmission for a rear engine drive vehicle comprising a housing, a tubular clutch shaft extending into one end of said housing and having an enlarged drive gear portion, a tubular transmission main shaft journalled at one end in said drive gear portion and at the opposite end in the remote end of said transmission, a countershaft, axially spaced change speed gear sets between said countershaft and main shaft, a bevel gear keyed on said main shaft substantially in the longitudinal center thereof, and a second bevel gear along the side of said transmission driven from said first bevel gear and having a laterally directed output shaft.

10. In a vehicle, an engine arranged transversely of the vehicle and having a clutch and clutch housing, a transmission housing bolted to the rear face of said clutch housing, a shaft connected directly to said engine and extending through both said housings, a clutch driven shaft in said clutch housing having a driving gear in the forward end of said transmission housing, a countershaft in said transmission housing driven from said drive gear, a main shaft in said transmission housing journalled at its forward end in said drive gear and at its rear end in the rear end wall of said transmission, change speed gearing between said countershaft and main shaft, a laterally directed output shaft extending into one side of said transmission housing, and gearing between said main shaft and said output shaft.

11. The vehicle of claim 10 further characterized in that said main shaft is tubular and said directly connected shaft extends therethrough in said transmission housing, and bearing means in said main shaft at opposite ends thereof journalling said directly connected shaft therein.

12. In combination, in a transmission housing, a first shaft extending through said housing, a coaxial tubular clutch driven shaft extending into one end of said housing and having a drive pinion gear formed on the end within said housing, a tubular main shaft in said housing about said first shaft and journalled at one end in said gear, change speed gearing in said housing for driving said main shaft from said clutch driven shaft, a laterally directed output shaft journalled in one side wall of said housing, and bevel gear means between said main shaft and the inner end of said output shaft.

13. The combination of claim 12 wherein said main shaft has bearing means rotatably supporting said first shaft therein.

ALFRED E. GRATER.